United States Patent [19]

Newman

[11] Patent Number: 5,146,367
[45] Date of Patent: Sep. 8, 1992

[54] ARRANGEMENTS FOR, METHOD OF, AND LENSES CONFIGURED TO PROVIDE THERMAL COMPENSATION IN LENS ELEMENT MOUNTS

[75] Inventor: Peter A. Newman, Rochester, N.Y.

[73] Assignee: Eastman Kodak Company, Rochester, N.Y.

[21] Appl. No.: 738,412

[22] Filed: Jul. 30, 1991

[51] Int. Cl.⁵ .................................. G02B 7/02
[52] U.S. Cl. ........................... 359/820; 359/819
[58] Field of Search .............. 359/820, 819, 818

[56] References Cited

U.S. PATENT DOCUMENTS

| 4,506,951 | 3/1985 | Yamada .................... | 359/830 |
| 4,812,015 | 3/1989 | Iizuka et al. ............. | 359/819 |
| 4,919,519 | 4/1990 | Fantozzi et al. .......... | 359/820 |

FOREIGN PATENT DOCUMENTS

| 5928107 | 2/1984 | Japan . |
| 5931910 | 2/1984 | Japan . |
| 5931911 | 2/1984 | Japan . |
| 5983114 | 5/1984 | Japan . |

*Primary Examiner*—Janice A. Howell
*Assistant Examiner*—Don Wong
*Attorney, Agent, or Firm*—Millen, White & Zelano

[57] ABSTRACT

Mounts for plastic lens elements of differing diameters or materials include a separate V-block for mounting each lens element, wherein the V-blocks for lens elements of a smaller diameter converge at angles less than V-blocks for lens elements of a larger diameter, the angles of convergence being selected so that the centers of the lens elements remain aligned with an optical axis perpendicular to both of the lens elements upon thermal expansion of the lens elements.

30 Claims, 5 Drawing Sheets

ARRANGEMENTS FOR, METHOD OF, AND LENSES CONFIGURED TO PROVIDE THERMAL COMPENSATION IN LENS ELEMENT MOUNTS

DESCRIPTION

1. Technical Field

The instant invention relates to arrangements for, methods of, and lenses configured to provide thermal compensation in mounts for elements such as lenses. More particularly, the instant invention relates to such arrangements, methods, and configurations for providing thermal compensation in V-mounts for mounting elements such as lenses.

2. Background Art

For a number of years, plastic lenses have been used in cameras and other optical instruments because they are less expensive to manufacture than glass lenses and much lighter in weight. Plastic lens elements are preferable in zoom lenses for hand-held cameras because zoom lenses tend to project a considerable distance beyond the camera body. If glass lens elements are used in zoom lenses, the weight of zoom lenses makes such cameras more difficult to use. This is especially the case when taking photographs while holding the camera in one hand. It is, of course, important that individual plastic lens elements used in zoom lenses remain in proper optical alignment with one another, regardless of changes in environmental conditions.

Considering the problem more generally, circular plastic elements, such as plastic lens elements, are mounted in multi-element assemblies, where it is necessary to provide low decentration tolerances. When subject to temperature changes, plastic elements undergo thermal expansion and contraction, which, in the case of plastic lens elements aligned in a barrel, is sufficient to distort images transmitted therethrough. Preferably, mounts supporting lens elements should provide optically acceptable alignment over selected temperature ranges in combination with rigid lens supporting surfaces, clearance-free assembly, and minimal stress induced by temperature changes. Current mount designs for plastic lenses do not meet at least one of these requirements.

Attempts to minimize the deleterious effects of thermal expansion in plastic lenses is addressed in a number of patents, such as U.S. Patent Nos. 3,205,774; 4,506,951; 4,723,833: and 4,812,015, as well as a host of Japanese published applications, such as Application Nos. 59-28107, 59-31910, 59-31911, 59-83114, 59-87508, 59-232305, and 62-255908. A common deficiency in the mounting arrangements disclosed in these documents is that the lenses are not positively held on rigid supports so that alignment with an optical axis depends on a force equilibrium which tends to be sensitive to manufacturing and assembly variations.

One approach to providing a rigid support for elements such as plastic lenses is the V-mount, wherein lens elements are aligned with an optical axis by being spring loaded into abutment with the converging walls of a "V-block". Such an arrangement provides positioning against a rigid support with clearance-free assembly; however, with such an arrangement, variations in temperature can cause misalignment between lens elements due to thermal expansion. When a pair of lens elements are optically aligned at one temperature, e.g., room temperature, and the temperature is increased by, e.g., 50° F., the optical centers of the lens elements no longer coincide with an optical axis extending perpendicular to the lens elements, resulting in a distortion of images transmitted by the lens elements. Accordingly, there is a need for an arrangement for mounting elements such as plastic lenses on V-mounts while compensating for thermal expansion so that the centers of the elements remain in proper optical alignment.

SUMMARY OF THE INVENTION

It is an object of the instant invention to provide new and improved methods of and arrangements for mounting elements such as plastic lenses in V-mounts in such a way as to compensate for thermal expansion of the elements so that the elements remain aligned over a selected temperature range.

Upon further study of the specification and appended claims, further objects and advantages of this invention will become apparent to those skilled in the art.

In view of this object and other objects, the instant invention contemplates a lens mounting arrangement for mounting at least a first lens element and a second lens element having a rate of thermal expansion different from the first lens element, wherein each lens element has a center point and wherein the center points are intersected by an optical axis which is substantially perpendicular to both lens elements over a selected temperature range. A first supporting member for supporting the first lens element has first and second supporting surfaces which engage the first lens element at first and second points thereon, wherein tangents to those points converge toward one another at a first selected angle. A second supporting member for supporting the second lens element has first and second surfaces which engage the second lens element at first and second points on the second lens element, wherein tangents to the first and second points on the second lens element converge toward one another at a second angle different from the first angle. The first and second angles are selected so that upon thermal expansion of the lens elements within the selected temperature range, the centers of the lens elements remain aligned with a single optical axis extending substantially perpendicular to both lens elements.

The invention further contemplates a lens which includes therein a plurality of lens elements, at least one of which has a diameter or material different from the other lens elements. Each lens element is supported by a pair of supporting surfaces which engage the lens element at a pair of points on the periphery of the lens element, wherein a pair of tangents to the pair of points converge at a selected angle $\theta$. The selected angle $\theta$ for each pair of tangents is selected to provide a substantially constant value K for each pair of supporting surfaces when the angle $\theta$ is substituted into the equation:

$$\frac{R\alpha}{\sin\theta/2} = K$$

wherein:
R is the radius of the lens element,
$\alpha$ is the thermal coefficient of expansion for the lens element, and
$\theta$ is the selected angle.

The instant invention further contemplates a zoom lens utilizing the aforedescribed arrangement and a method of mounting at least two plastic lens elements employing steps to accomplish the aforedescribed arrangement.

DETAILED DESCRIPTION

Figure 1:
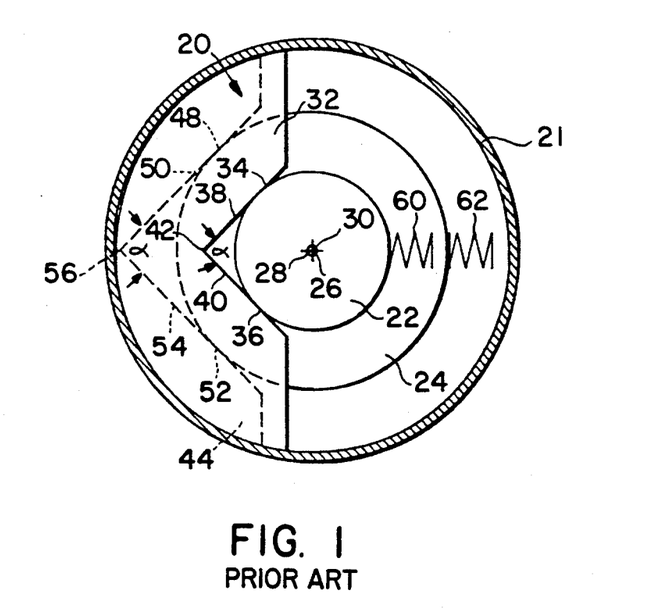
FIG. 1 is a generally schematic front view of a prior art V-mount.
Figure 2:
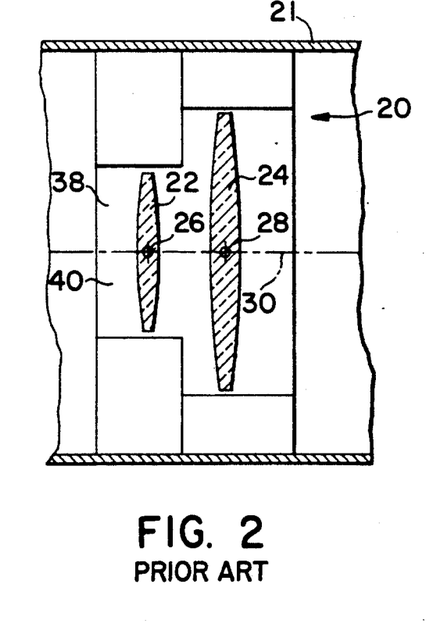
FIG. 2 is a side view of the prior art V-mount of FIG. 1.
Figure 3:
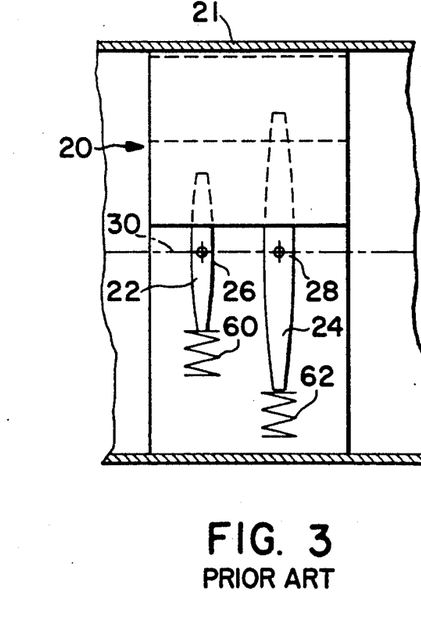
FIG. 3 is a top view of the prior art V-mount of FIGS. 1 and 2.

Referring now to FIGS. 1, 2, and 3, there is shown a V-mount arrangement, designated generally by the numeral 20, for mounting a first lens 22 and a second lens 24 in accordance with prior art practices. The first lens 22 has a diameter less than that of the second lens 24. The first and second lenses 22 and 24 are positioned by the V-mount 20 within a lens barrel 21 so that the centers 26 and 28 thereof are held in optical alignment with an optical axis 30.

Alignment of the lenses 22 and 24 with the optical axis 30 is accomplished by abutting the first lens with a first V-block 32 at points 34 and 36 on converging straight walls 38 and 40, which form the first V-block and extended tangentially to the lens element. The converging walls 38 and 40 intersect at an apex 42. The second lens 24 abuts V-block 44 at point 48 on tangentially extending straight wall 50 and at point 52 on tangentially extending straight wall 54. The walls 50 and 54 intersect at an apex 56, which lies in the same plane as the apex 42 of V-block 32, the optical axis 30 of the system, and the center points 26 and 28 of lens elements 22 and 24.

The lenses 22 and 24 are held in the V-blocks 32 and 44 by spring elements 60 and 62. The spring elements 60 and 62 ensure that the lenses 22 and 24 are positively held in place, while allowing the lenses to expand radially away from the V-blocks 32 and 44 so that the center points 26 and 28 assume the position shown in FIGS. 4-6 with respect to the optical axis 30.

Figure 4:
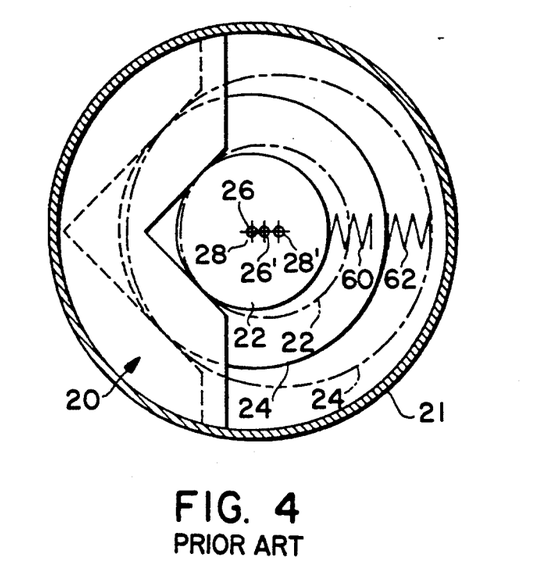
FIG. 4 is a front view of the prior art V-mount of FIGS. 1-3 showing exaggerated expansion and misalignment after a temperature increase.
Figure 5:
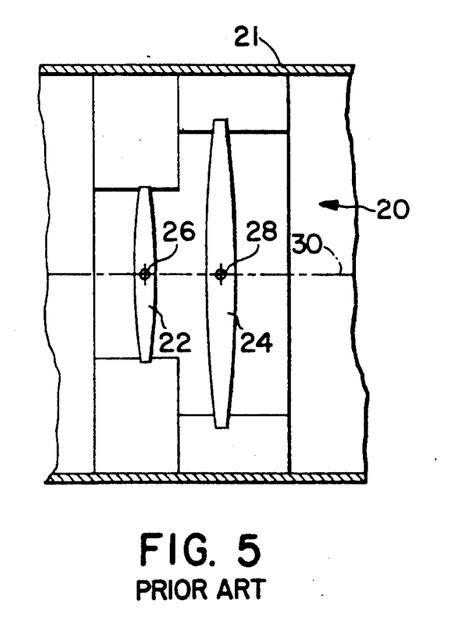
FIG. 5 is a side view of the prior art V-mount of FIGS. 1-3 showing exaggerated expansion after the temperature increase.
Figure 6:
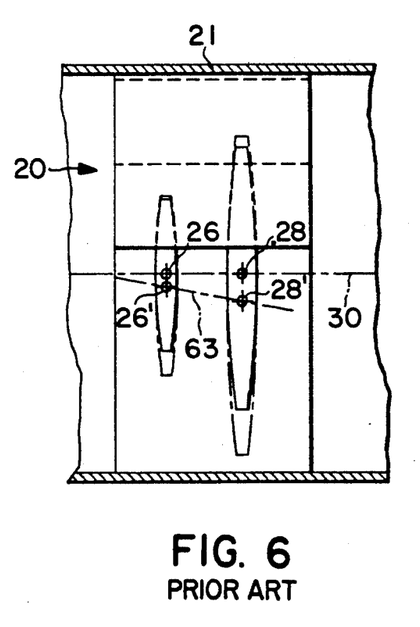
FIG. 6 is a top view of the prior art V-mount of FIGS. 1-3 showing exaggerated expansion and misalignment after the temperature increase.
Figure 7:
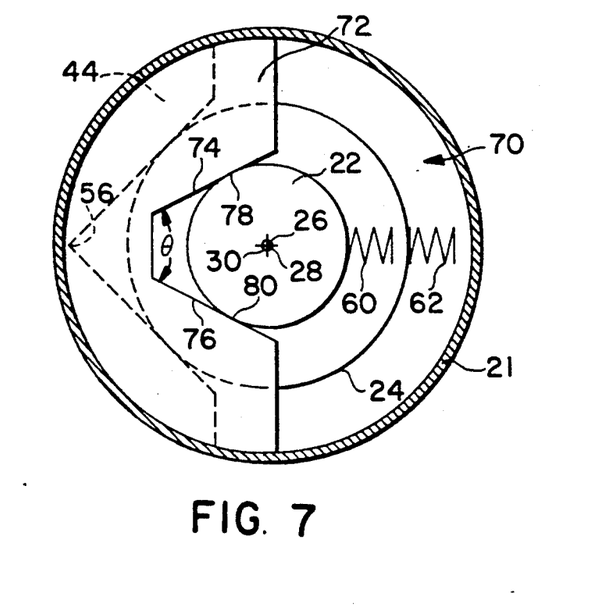
FIG. 7 is a front view of a thermally compensated V-mount configured in accordance with the instant invention at room temperature.

Referring now specifically to FIGS. 4-6, it is seen that the first lens 22 has expanded from its solid line position to its dotted line position and that second lens 24 is also expanded from its solid line position to its dotted line position. This causes the center 28 of second lens 24 to shift a greater distance from its initial position with respect to the original optical axis 30 than the center 26 of the first lens 22. As is seen in FIGS. 4 and 6, the centers 26 and 28 misalign with one another as the lenses 22 and 24 expand. Since the lenses 22 and 24 now have different optical axes, a degraded image is transferred through the lens barrel 21. As is specifically seen in FIG. 6, a line 63 intersecting both the point 26' of thermally expanded lens element 22 and center point 28' of thermally expanded lens element 24 is perpendicular to neither lens element and is oblique with respect to the axis 30 of barrel 21.

While only two lens elements 22 and 24 are discussed, zoom lenses generally employ more than two lens elements; however, with respect to the problem under consideration here, misalignment can result any time there are a plurality of lens elements.

In zoom lenses, the lens elements 22 and 34 are made of styrene or acrylic resin and have diameters which expand beyond acceptable tolerance limits as temperatures approach 50° F. above room temperature. Table shows that decentration does, in fact, exceed an allowable tolerance of 0.010 mm:

TABLE 1

| | Decentration Caused by Thermal Expansion | | |
|---|---|---|---|
| Element | Diameter (mm) | Thermal Coefficient × $10^{-5}$ °F.$^{-1}$ | Decentration for 50° F. change in 90° V-block |
| A1 | 17.72 | 3.5 | 0.022 |
| A2-A3 | 19.72 | 3.5 | 0.024 |
| A4 | 19.72 | 3.6 | 0.025 |
| B1 | 26.67 | 3.5 | 0.033 |
| B2 | 29.52 | 3.6 | 0.038 |
| | | Max | 0.038 |
| | | Min | 0.022 |
| | | Difference | 0.016 |
| | | Tolerance | 0.010 |

From Table 1, it is seen that the maximum expansion of 0.038 mm and a minimum expansion of 0.022 mm leaves a difference of 0.016 mm, which exceeds the acceptable tolerance of 0.010 mm by a substantial amount.

Referring now to FIGS. 7-12, there is shown a thermally compensated V-mount, designated generally by the numeral 70, configured in accordance with the principles of the instant invention, wherein similar reference numerals identify similar structure. In the thermally compensated V-mount 70, the second lens element 24 is retained in the same V-block 44 as that of FIGS. 1-6 having a 90° angle between the tangentially extending straight walls 50 and 54, while the first lens 22, having a smaller diameter, is retained in a V-block, designated generally by the numeral 72, which has tangentially extending straight walls 74 and 76 that converge at an angle $\theta_2$ which is less than the angle $\theta_1$ of the first V-block 44. As with the prior art embodiments of FIGS. 1-6, the lens 22 engages the walls 74 and 76 at tangential points 78 and 80.

Figure 8:
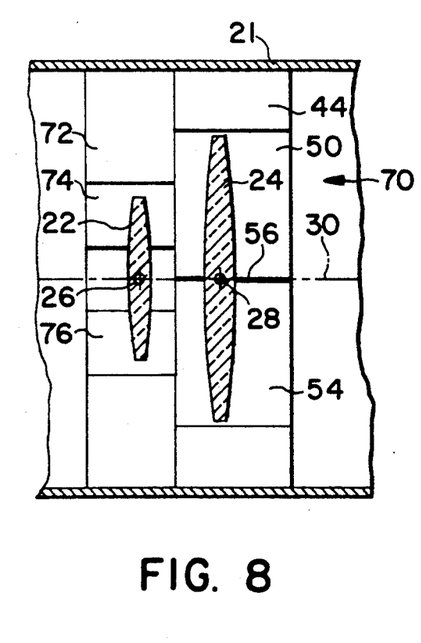
FIG. 8 is a side view of the thermally compensated V-mount of FIG. 7.
Figure 9:
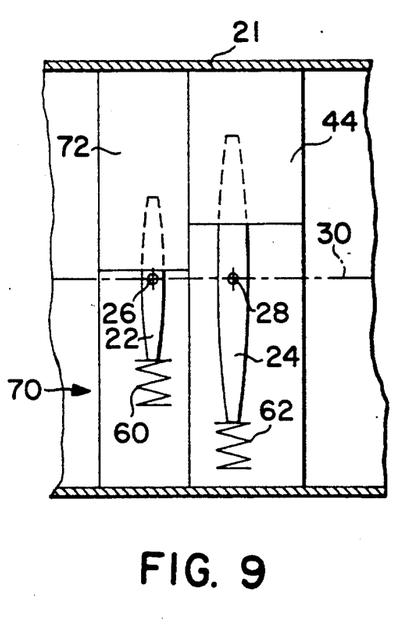
FIG. 9 is a top view of the thermally compensated V-mount of FIGS. 7 and 8.

As is evident from FIGS. 8 and 9, the center points 26 and 28 remain in alignment with the optical axis 30 of the system 70 when the system is at room temperature.

Figure 10:
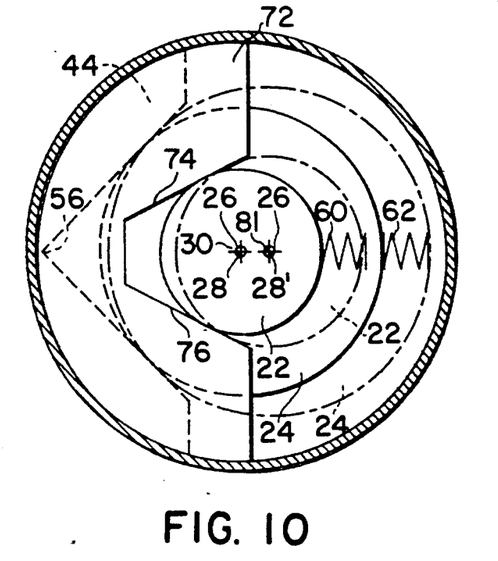
FIG. 10 is a front view of the thermally compensated V-mount of FIGS. 7-9 showing exaggerated expansion with alignment after a temperature increase.
Figure 11:
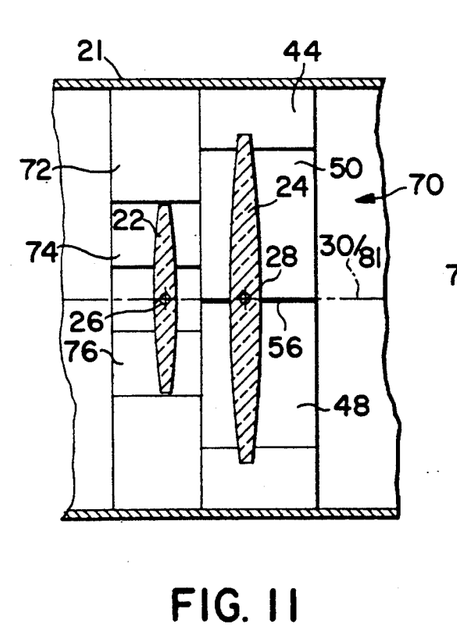
FIG. 11 is a side view of the thermally compensated V-mount of FIGS. 7-9 showing exaggerated expansion with alignment after the temperature increase.
Figure 12:
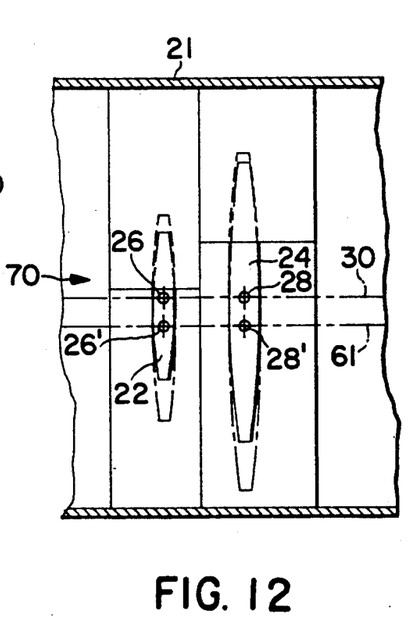
FIG. 12 is a top view of the thermally compensated V-mount of FIGS. 7-9 showing exaggerated expansion with alignment of lens elements after the temperature increase.

Referring now more specifically to FIGS. 10-12, wherein the lens mounting system 70 is subject to a temperature increase approaching 50° F., it is seen that the first lens element 22 and second lens element 24 both expand away from the V-blocks 72 and 44, respectively, against the bias of springs 60 and 62 from the solid line position to the dotted line position. As is seen in FIGS. 10-12, the centers 26' and 28' of the lens elements 22 and 24 remain aligned with an axis 81, which shifts laterally slightly within the barrel 21. As is seen in FIG. 12, the axis 81 is perpendicular to both lens element 22 and lens element 24 while being parallel to barrel axis 30. The images transmitted by the lenses are shifted slightly away from the V-mount 70, but the image focused on the film is not adversely affected, as would be the case if the lenses 22 and 24 were optically out of alignment with one another.

Figure 13:
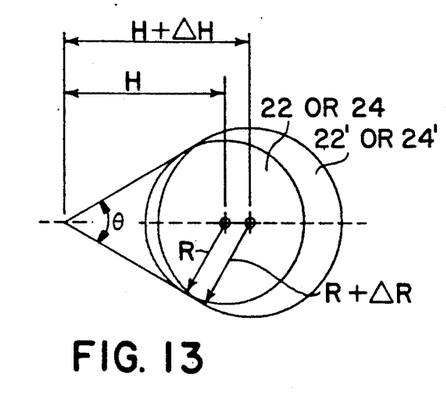
FIG. 13 is a schematic illustration showing geometric relationships used to configure the V-mount in accordance with the instant invention.

Referring now to FIG. 13 and the geometrical expressions associated therewith, it is seen that $$\Delta R = R\alpha \Delta T,$$

where
$\Delta R$ = change in radius dimension,
R = radius dimension of the lens element,
$\alpha$ = thermal coefficient of expansion for the plastic material, and
$\Delta T$ = change in temperature.
For the geometry shown in FIG. 13:

$$H = \frac{R}{\sin\theta/2}$$

where
H = dimension from element center to V apex
$\theta$ = angle of V-block.

When one takes the derivative of H with respect to R, then $$\frac{dH}{dR} = \frac{1}{\sin\theta/2}$$

Therefore, the decentering due to thermal expansion is $$\Delta H = \frac{R\alpha}{\sin\theta/2} \Delta T.$$

In the traditional V-mount, where the V-block angle for each element is the same, elements with a different $R\alpha$ factor will decenter at different rates, since $\Delta T$ is the same for all elements.

In accordance with the instant invention, $$\frac{R\alpha}{\sin\theta/2} = K$$

where K is a constant.

In most situations, the thermal coefficient $\alpha$ and the radius R of the elements are fixed by the lens design. Thus, the V-block angle is the parameter to select for each element to make the factor $$\frac{R\alpha}{\sin\theta/2} = K$$

a constant.

The angle of the V-block for one of the elements may be independently selected to form the constant $R\alpha/\sin\theta$ from which the other angles are computed.

The following Table 2 illustrates a sample computation:

TABLE 2

| Calculation of V-block Angles for Thermal Alignment Compensation | | | |
|---|---|---|---|
| Element | Diameter (mm) | Thermal Coefficient × $10^{-5}$ °F.$^{-1}$ | Angle of V-Block for Thermal Compensation (degrees) |
| A1 | 17.72 | 3.5 | 60.717 |
| A2-A3 | 19.72 | 3.5 | 68.451 |
| A4 | 19.72 | 3.6 | 70.694 |
| B1 | 26.67 | 3.5 | 99.049 |
| B2 | 29.52 | 3.6 | 120.000 |
| Input B2 angle | | 120 | |
| Calculated const. | | 0.000613 | |

There are limits on the angle which the V-block can take. The maximum angle is, of course, less than 180°, which is a flat wall. How much less of an angle depends on the accurate positioning of the loading by springs 60 and 62, which urges the lens element into the V-block so as to guarantee that the element is pushed into positive engagement with the two contact points.

The minimal angle of the V-block is determined by the coefficient of friction between the element and the mount. The invention requires that the element slip up and down the V as temperature changes. To guarantee slipping, the angle of the V-block must be greater than the minimum angle calculated from the coefficient of friction $$\theta_{min} > arctan(\mu)$$

where
$\theta_{min}$ = minimum V-block half-angle
$\mu$ = coefficient of friction between lens and mount.

For example, for a coefficient of friction of 0.4, the minimum V-block half-angle would be 21.8°.

In practicing the instant invention, there are four assumptions which must be taken into consideration. The optical axis of the system 30 or datum axis must be determined by the elements 22 and 24 and not by the mount because all of the elements decenter equally so there is no relative decentration. All of the V-apexes must remain aligned, with no rotation of one V-block with respect to the other. In other words, V-block 72 cannot rotate about the axis 30 with respect to the V-block 44. Thermal focus shifts caused by temperature changes are removed by through-the-lens autofocusing.

If the lenses are made of a plastic material subject to non-negligible dimensional changes due to variations in relative humidity, the advantages of the instant invention may be compromised. Moreover, it is assumed that the thermal expansion of the V-blocks 44 and 72, as well as the barrel in which they are retained, is negligible. When the difference between the thermal expansion coefficient of the mounts 72, 44 and the barrel is an order of magnitude less than the thermal coefficient of the lens elements 22 and 24, the expansion of the mount may be neglected. This is the case where plastic lens elements 22 and 24 are retained in metallic mounting elements 44 and 72.

Figure 14:
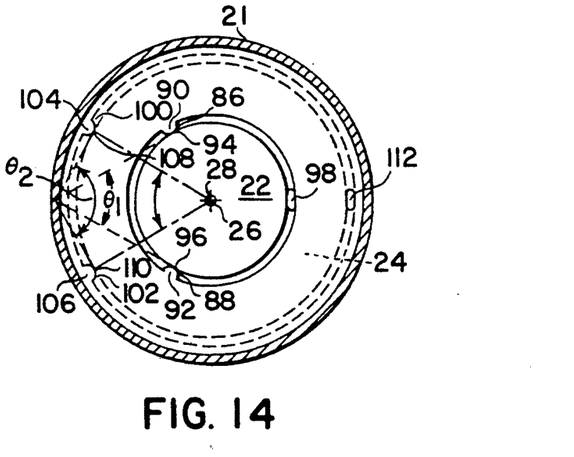
FIG. 14 is a front view of a lens mounting arrangement utilizing the principles of the instant invention, wherein the V-block geometry is provided by protrusions within a lens barrel.
Figure 15:
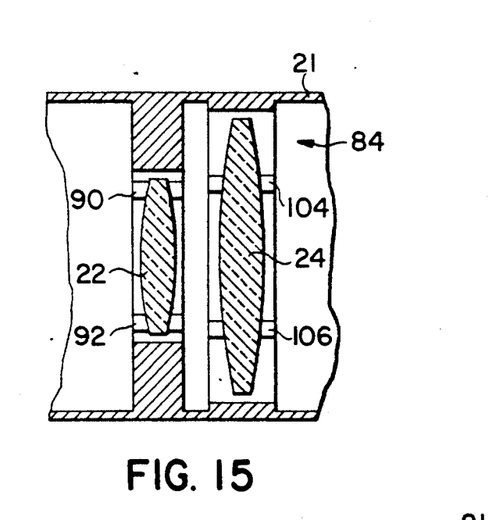
FIG. 15 is a side view of the arrangement of FIG. 14.
Figure 16:
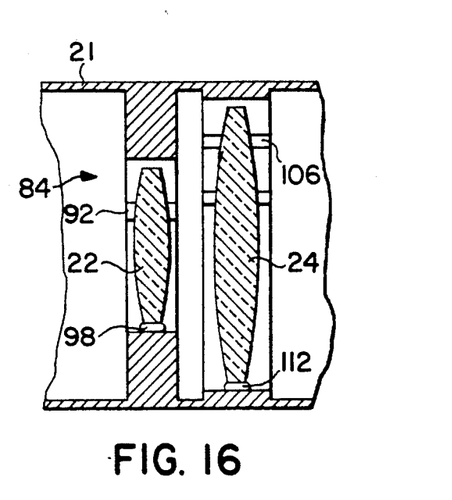
FIG. 16 is a top view of the arrangement of FIG. 14.

Referring now to FIGS. 14-16, there is shown an embodiment of the invention employing the principles set forth in FIGS. 7-10, wherein the V-block geometry is provided by pairs of convex bearing surfaces. In this embodiment, a lens barrel, designated generally by the numeral 84, retains the small diameter lens 22 in contact with first and second bearing surfaces 86 and 88 on convex projections 90 and 92 at points 94 and 96 by urging of an elastomer element 98. The large diameter lens 24 is urged into engagement with surfaces 100 and 102 on projections 104 and 106 at points 108 and 110 by an elastomer 112. As is seen in FIG. 14, if the required V-block angle formed by tangents extending from the points of contact is $2\theta$, the angle subtended by the contact points at the center of the element is $180° - 2\theta$ for each pair of contact points 94, 96, and 108, 110.

Figure 17:
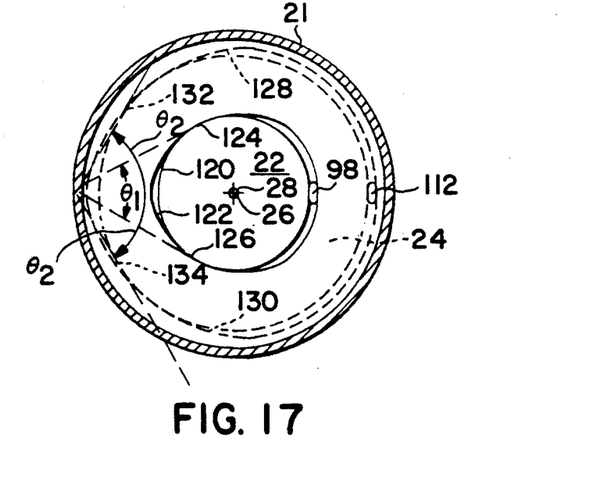
FIG. 17 is a front view of a lens mounting arrangement utilizing the principles of the instant invention, where the V-block geometry is provided by concave surfaces within the lens barrel.

Referring now to FIG. 17, concave lens mounting surfaces 120 and 122 support the first lens element 22 by engaging the first lens element at points 124 and 126, while concave lens mounting surfaces 128 and 130 support the second lens element 24 by engaging the second lens element at points 132 and 134. With respect to FIG. 17, the same geometrical considerations apply as in FIGS. 4-14, wherein the angles $\theta_1$ and $\theta_2$ are selected so that the product of the lens element radius and coefficient of thermal expansion divided by the sine of the half angles $\theta_1$ and $\theta_2$ are substantially constant for both angles. An advantage of the surface being concave, as opposed to convex, is that the bearing surface area increases rapidly so as to minimize decentration caused by local deformation due to spring load.

By selecting the V-block angle $\theta$ to exactly compensate for thermal expansion of the elements 22 and 24 and by having the lens elements spring loaded by springs 60 and 62 or elastomers 98 and 112 into the V-block, a rigidly positioned, clearance-free, stress-free, thermally compensated alignment system is provided. By increasing the alignment precision of a plastic lens element over a temperature range, the invention allows the lens designer to achieve more sensitive tolerances while using plastic lenses and to thus increase the imaging quality of zoom lenses utilizing such lens elements while minimizing expense.

Without further elaboration, it is believed that one skilled in the art can, using the preceding description, utilize the present invention to its fullest extent. The previously described specific embodiments are, therefore, to be construed as merely illustrative and not limitative of the remainder of the disclosure in any way whatsoever.

The entire disclosures of all applications, patents, and publications, cited above, are hereby incorporated by reference.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A lens mounting arrangement for mounting at least a first lens element and a second lens element, the second lens element having a different rate of thermal expansion from the first lens element, each lens element having a center point wherein the center points are intersected by an optical axis which is substantially perpendicular to both lens elements over a selected temperature range, the arrangement comprising:

a first supporting member for supporting the first lens element, the first supporting member having first and second supporting surfaces which engage the first lens element at first and second points thereon and wherein tangents to those points converge toward one another at a first selected angle; and a second supporting member for supporting the second lens element, the second supporting element having first and second surfaces which engage the second lens element at first and second points on the second lens element, wherein tangents to the first and second points on the second lens element converge toward one another at a second angle different from the first angle, the first and second angles being selected such that upon thermal expansion of the lens elements within the selected temperature range, the centers of the lens elements remain aligned with a single optical axis extending substantially perpendicular to both lens elements.

2. The arrangement of claim 1, wherein the first and second angles are selected according to the following equation:

$$\frac{R_1 \alpha_1}{\sin \theta_1 / 2} = \frac{R_2 \alpha_2}{\sin \theta_2 / 2}$$

wherein
$R_1$ is the radius of the first lens element,
$R_2$ is the radius of the second lens element,
$\alpha_1$ is the thermal coefficient of expansion of the first lens element,
$\alpha_2$ is the thermal coefficient of expansion of the second lens element,
$\theta_1$ is the first angle, and
$\theta_2$ is the second angle.

3. The arrangement of claim 2, further including spring elements for urging the lens elements into abutment with the supporting surfaces.

4. The arrangement of claim further including spring elements for urging the lens elements into abutment with the supporting surfaces.

5. The arrangement of claim wherein the supporting surfaces of the support members are flat surfaces.

6. The arrangement of claim 1, wherein the supporting surfaces of the support members are convex surfaces.

7. The arrangement of claim 1, wherein the supporting surfaces of the support members are concave surfaces.

8. The arrangement of claim 1, wherein the lens elements are made of plastic.

9. The arrangement of claim 8, wherein the lens elements have different diameters.

10. The arrangement of claim 1, wherein the lens elements have different coefficients of thermal expansion.

11. The arrangement of claim 1, wherein the lens elements have different diameters.

12. A zoom lens for a camera, the zoom lens having at least a first lens element and a second lens element, the second lens element having a different rate of thermal expansion from the first lens element, each lens element having a center point wherein the center points are intersected by an optical axis which is substantially perpendicular to both lens elements over a selected temperature range, the zoom lens comprising:
  a barrel having at least first and second supporting members therein for supporting the first and second lens elements, respectively;
  the first supporting member having first and second supporting surfaces which engage the first lens element at first and second points thereon, wherein tangents to those points converge toward one another at a first selected angle; and
  the second supporting member having first and second surfaces which engage the second lens element at first and second points on the second lens element, wherein tangents to the first and second points on the second lens element converge toward one another at a second angle different from the first angle, the first and second angles being selected such that upon thermal expansion of the lens elements within the selected temperature range, the centers of the lens elements remain aligned with a single optical axis extending substantially perpendicular to both lens elements.

13. The zoom lens of claim 12, wherein the first and second angles are selected according to the following equation $$\frac{R_1 \alpha_1}{\sin\theta_1/2} = \frac{R_2 \alpha_2}{\sin\theta_2/2}$$

wherein
  $R_1$ is the radius of the first lens element,
  $R_2$ is the radius of the second lens element,
  $\alpha_1$ is the thermal coefficient of expansion of the first lens element,
  $\alpha_2$ is the thermal coefficient of expansion of the second lens element,
  $\theta_1$ is the first angle, and
  $\theta_2$ is the second angle.

14. The zoom lens of claim 13, further including spring elements for urging the lens elements into abutment with the supporting surfaces.

15. The zoom lens of claim 14, wherein the supporting surfaces of the support members are flat surfaces.

16. The zoom lens of claim 14, wherein the supporting surfaces of the support members are convex surfaces.

17. The zoom lens of claim 14, wherein the supporting surfaces of the support members are concave surfaces.

18. The zoom lens of claim 12, wherein the lens elements are made of plastic.

19. The zoom lens of claim 18, wherein the lens elements have different diameters.

20. The zoom lens of claim 12, wherein the lens elements have different coefficients of thermal expansion.

21. The zoom lens of claim 12, wherein the lens elements have different diameters.

22. A lens wherein the lens includes therein a plurality of lens elements, at least one of which has a different rate of thermal expansion from the other lens element, the lens comprising:
  a plurality of supporting members, each of which supports a lens element, the supporting members each including a pair of supporting surfaces which engage the respective lens element at a pair of points on the periphery of the lens element with a pair of tangents to the pair of points converging at a selected angle $\theta$, the selected angle $\theta$ for each pair of tangents being selected to provide a constant value K for each pair of supporting surfaces when the angle $\theta$ is substituted into the equation:

$$\frac{R\alpha}{\sin\theta/2} = K$$

wherein
  R is the radius of the lens element,
  $\alpha$ is the thermal coefficient of expansion for the lens element, and
  $\theta$ is the selected angle.

23. The lens of claim 22, wherein the lens is a zoom lens for a camera and wherein the lens elements are made of plastic.

24. The lens of claim 23, wherein the lens elements and supporting members are retained within a barrel and wherein the lens elements are of different diameters.

25. The lens of claim 24, wherein at least one of the lens elements is of a different material.

26. A method of mounting at least two plastic lens elements in a barrel, wherein the lens elements remain with the center points thereof aligned with an optical axis which is perpendicular to the lens elements and extends through the center points over a selected temperature range, the method comprising the steps of:
  supporting the first lens element on a first pair of fixed first and second supporting surfaces which engage the first lens element at first and second points thereon, wherein tangents to those points converge toward one another at a first selected angle;
  supporting the second lens element on a second pair of fixed first and second supporting surfaces which engage the second lens element at first and second points on the second lens element, wherein tangents to the second lens element passing through the first and second points thereon converge to a second selected angle different from the first selected angle; and
  selecting the second selected angle according to the following equation:

$$\frac{R_1 \alpha_1}{\sin\theta_1/2} = \frac{R_2 \alpha_2}{\sin\theta_2/2}$$

wherein
  $R_1$ is the radius of the first lens element,
  $R_2$ is the radius of the second lens element,
  $\alpha_1$ is the thermal coefficient of expansion of the first lens element,
  $\alpha_2$ is the thermal coefficient of expansion of the second lens element,
  $\theta_1$ is the first angle, and
  $\theta_2$ is the second angle.

27. The method of claim 26, further including the step of urging the lens elements into abutment with the supporting surfaces with spring biasing means.

28. The method of claim 27, wherein the supporting surfaces are flat surfaces.

29. The method of claim 27, wherein the supporting surfaces are convex surfaces.

30. The method of claim 27, wherein the supporting surfaces are concave surfaces.

* * * * *

UNITED STATES PATENT AND TRADEMARK OFFICE
CERTIFICATE OF CORRECTION

PATENT NO. : 5,146,367
DATED      : September 8, 1992
INVENTOR(S) : P. A. Newman It is certified that error appears in the above-identified patent and that said Letters Patent is hereby corrected as shown below:

Col. 8, line 51, after "Claim" insert --1--.

Col. 8, line 54, after "Claim" insert --1--.

Signed and Sealed this

Eleventh Day of January, 1994

Attest:

BRUCE LEHMAN

Attesting Officer

Commissioner of Patents and Trademarks